(12) United States Patent
Lin (10) Patent No.: US 8,279,527 B2
(45) Date of Patent: Oct. 2, 2012

(54) WIDE-ANGLE PROJECTION OPTICAL SYSTEM

(75) Inventor: Lai-Chang Lin, Taoyuan Hsien (TW)

(73) Assignee: Delta Electronics, Inc., Taoyuan Hsien (TW)

( * ) Notice: Subject to any disclaimer, the term of this patent is extended or adjusted under 35 U.S.C. 154(b) by 238 days.

(21) Appl. No.: 12/797,818

(22) Filed: Jun. 10, 2010

(65) Prior Publication Data

US 2010/0315725 A1 Dec. 16, 2010

Related U.S. Application Data

(60) Provisional application No. 61/187,361, filed on Jun. 16, 2009.

(51) Int. Cl.
*G02B 9/00* (2006.01)
*G02B 17/00* (2006.01)
*G02B 13/04* (2006.01)

(52) U.S. Cl. ......... 359/649; 359/648; 359/728; 359/749

(58) Field of Classification Search ........... 359/649–651
See application file for complete search history.

(56) References Cited

U.S. PATENT DOCUMENTS

| | | | |
|---|---|---|---|
| 6,631,994 B2 | 10/2003 | Suzuki et al. | |
| 6,771,427 B1 | 8/2004 | Matsuo | |
| 6,994,437 B2 | 2/2006 | Suzuki et al. | |
| 7,048,388 B2 | 5/2006 | Takaura et al. | |
| 7,133,084 B2 * | 11/2006 | Moskovich et al. | 348/779 |
| 7,239,452 B2 | 7/2007 | Kuwa | |
| 7,448,756 B2 | 11/2008 | Cho et al. | |
| 7,529,032 B2 | 5/2009 | Takaura et al. | |
| 8,182,097 B2 * | 5/2012 | Hirata et al. | 353/70 |
| 2005/0200974 A1 * | 9/2005 | Nishikawa et al. | 359/691 |
| 2006/0132723 A1 * | 6/2006 | Yamagishi | 353/98 |
| 2007/0253076 A1 * | 11/2007 | Takaura et al. | 359/780 |
| 2010/0232038 A1 * | 9/2010 | Kang et al. | 359/717 |

\* cited by examiner

*Primary Examiner* — Jordan Schwartz (74) *Attorney, Agent, or Firm* — Kirton McConkie; Evan R. Witt (57) ABSTRACT

A wide-angle projection optical system includes a first lens set with positive power, an aperture stop, a second lens set with positive power, a third lens set with negative power, and a negative power reflecting mirror. The first lens set provides optical characteristics to match with a light beam coming from the object side. The second lens set is arranged behind the aperture stop to converge the light beam. The third lens set is configured to diverge the light to enlarge a full field angle. The negative power reflecting mirror is configured to further enlarge the full field angle and correct image distortion. The first lens set, the second lens set, the third lens set and the reflecting mirror have a common optical axis. The optical axis is shifted with respect to a center of a micro display.

10 Claims, 6 Drawing Sheets

FIG. 6

WIDE-ANGLE PROJECTION OPTICAL SYSTEM

CROSS-REFERENCE TO RELATED APPLICATION

This application claims the benefit of U.S. Provisional Application No. 61/187,361 filed on Jun. 16, 2009, and entitled "WIDE-ANGLE PROJECTION OPTICAL SYSTEM AND IMAGE DISPLAY APPARATUS", the entirety of which is hereby incorporated by reference.

FIELD OF THE INVENTION

The present invention relates to a projection optical system, and more particularly to a wide-angle or an ultra-short throw projection optical system.

BACKGROUND OF THE INVENTION

A projection display apparatus is widely used to produces an enlarged image of a small-sized micro-display through a projection optical system (or a projection lens). The small-sized micro-display includes for example a high temperature liquid crystal display (HTLCD), a digital micro-minor display (DMD) or a liquid crystal on silicon (LCoS).

Generally, a wide-angle projection lens has a large field of view, or a short effective focal length (EFL). In comparison with a conventional projection lens, the projection display apparatus with a wide-angle projection lens is capable of producing a certain sized image at a shorter distance.

Figure 1A:
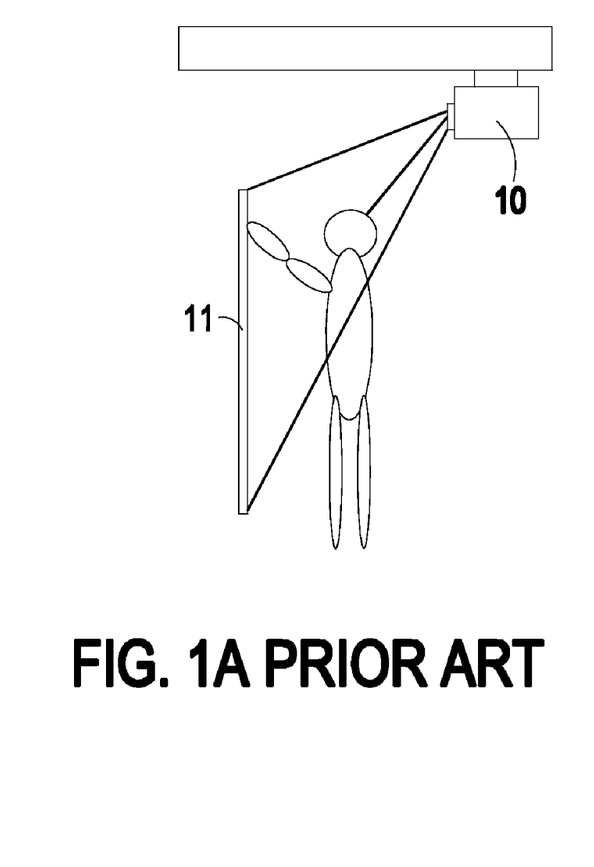
FIG. 1A is a schematic diagram illustrating an integrated system of a projection display apparatus and an interactive white board according to the prior art.

Recently, an integrated system of a projection display apparatus and an interactive white board has become very useful tool in classrooms, lecture rooms or conference rooms in order to provide the interactive functions about education, demonstration or entertainment. FIG. 1A is a schematic diagram illustrating an integrated system of a projection display apparatus and an interactive white board according to the prior art. As shown in FIG. 1A, the projection display apparatus 10 is usually mounted upside down over the white board 11. The conventional short-throw projection display apparatus 10 is usually mounted at a distance of about 1 meter away from the white board 11. As such, the lecturer with average height becomes an obstacle to the light path of the projection display apparatus 10 when writing on the white board 11. In addition, the eyes of the lecturer have the potential danger of being illuminated by the light from the projection display apparatus 10.

Figure 1B:
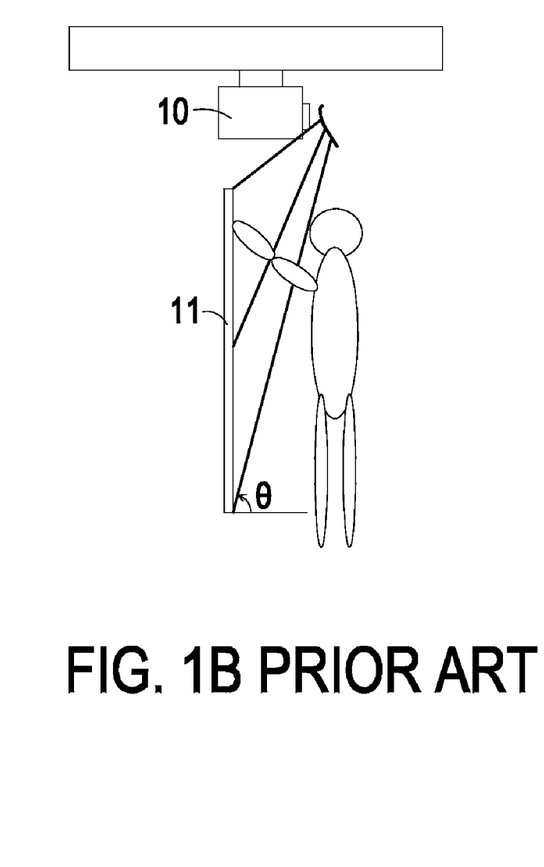
FIG. 1B is a schematic diagram illustrating an integrated system of a wide-angle projection display apparatus and an interactive white board according to the prior art.

For solving the above problems, as shown in FIG. 1B, the projection display apparatus 10 needs to be mounted in the vicinity of the white board 11. Since the projection distance is very short, the projection display apparatus 10 should have a wide-angle projection lens to provide a large full field angle θ or a very short focal length. In a case that the projection display apparatus 10 with a wide-angle projection lens is mounted over the white board 11, the light flux needs to incident on the white board 11 at a very steep angle, which incurs a large distortion in the image. Moreover, the projection lens also needs to have a large offset to avoid the light hitting on the main body of the projection display apparatus, and avoid the body of reflecting mirror blocking the top area of the white board. In other words, the wide-angle or ultra-short projection lens is very critical for designing the projection display apparatus.

U.S. Pat. Nos. 6,631,994 and 6,994,437 disclosed a lens design that incorporates negative lenses and a negative aspheric mirror to achieve a wide field of view. In this design, negative lenses with moderate power are used with the negative reflecting mirror. With such an arrangement of optical power, it is difficult to simultaneously achieve very large full field angle and high image quality at the same time.

U.S. Pat. No. 7,529,032 disclosed a wide-angle projection optical system. The design uses two aspheric plastic lenses, one double concave negative lens and a negative aspheric reflecting mirror. The total length of the system is quite long. This makes it difficult to have a thin projector system. In addition, the maximum field angle is on the order of 55 degree, which still requires a fairly long projection distance to produce an image that is large enough for practical applications.

U.S. Pat. No. 7,239,452 disclosed a wide-angle projection lens which uses aspheric lenses and reflecting mirror. However, one flat mirror is disposed between the negative lens group and the negative aspheric mirror. This type of optical path layout makes it suitable mostly for rear projection application, not convenient for front projection applications.

U.S. Pat. No. 6,771,427 disclosed a wide angle projection lens design that incorporates regular negative lens group and an aspheric reflecting mirror on the image side of the lens layout. Due to the use of regular spherical lenses, the full field angle of this design is quite small, and multiple flat reflecting mirrors are needed to achieve thin profile.

U.S. Pat. No. 7,048,388 disclosed a wide-angle projection lens design that incorporates a flat mirror and a positive aspheric reflecting mirror. Again, this type of layout tends to make the projector bulky and inconvenient to use with a white board.

U.S. Pat. No. 7,448,756 disclosed a wide-angle lens design that consists of a series of negative lenses and a negative reflecting mirror. In this design, an intermediate real image with a specific distortion is formed in the light path and is then re-imaged on to the screen by the rest of the optical system. Due to the formation of an intermediate real image, the optical path of this design tends to be long and complicated, which make it difficult to have a compact and thin display system.

SUMMARY OF THE INVENTION

It is an object of the present invention to provide a wide-angle or an ultra-short throw projection optical system with a full field angle larger than ±70 degrees.

An object of the present invention provides a wide-angle or an ultra-short throw projection optical system having a large full field angle, a short effective focal length, thin profile, low distortion, and high image quality.

In accordance with an aspect of the present invention, there is provided a wide-angle projection optical system. From an object side to an image side, the wide-angle projection optical system includes a first lens set with positive power, an aperture stop, a second lens set with positive power, a third lens set with negative power, and a negative power reflecting mirror. The first lens set is configured to provide optical characteristics to match with a light beam coming from the object side. The second lens set is arranged behind the aperture stop, and configured to converge the light beam. The third lens set is configured to diverge the light to enlarge a full field angle. The negative power reflecting mirror is closer to the image side than the first lens set, the second lens set and the third lens set, and configured to further enlarge the full field angle and correct image distortion. The first lens set, the second lens set, the third lens set and the reflecting mirror have a common optical axis. The optical axis is shifted with respect to a center of a micro display.

In accordance with another aspect of the present invention, there is provided a wide-angle projection optical system. From an object side to an image the, the wide-angle projection optical system includes a first lens set, an aperture stop, a second lens set, a third lens set with negative power, and a negative power reflecting mirror. The first lens set is configured to provide optical characteristics to match with a light beam coming from the object side. The second lens set is arranged behind the aperture stop, and configured to converge the light beam. The third lens set is configured to diverge the light to enlarge a full field angle. The third lens set comprises at least three convex-concave lenses, and both surfaces of each of at least two lenses of the third lens set are aspheric. The negative power reflecting mirror is arranged in the vicinity of the image side, and configured to further enlarge the full field angle and correct image distortion.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

The present invention provides a wide-angle projection optical system. The wide-angle projection optical system is applied to a projection display apparatus. The wide-angle projection optical system is used to produce an enlarged image of a small-sized micro-display (i.e. an object side) on a projection screen (i.e. an image side). The small-sized micro-display includes for example a high temperature liquid crystal display (HTLCD), a digital micro-minor display (DMD) or a liquid crystal on silicon (LCoS). In the wide-angle projection optical system of the present invention, the optical configuration of a projection lens is in the form of a reversed telephoto (or retro-focus) configuration. This type of optical configuration provides a back focal length (BFL) that is longer than the effective focal length (EFL). The long back focal length may provide space for the integration of illumination optics, micro display, and projection lens.

Figure 2:
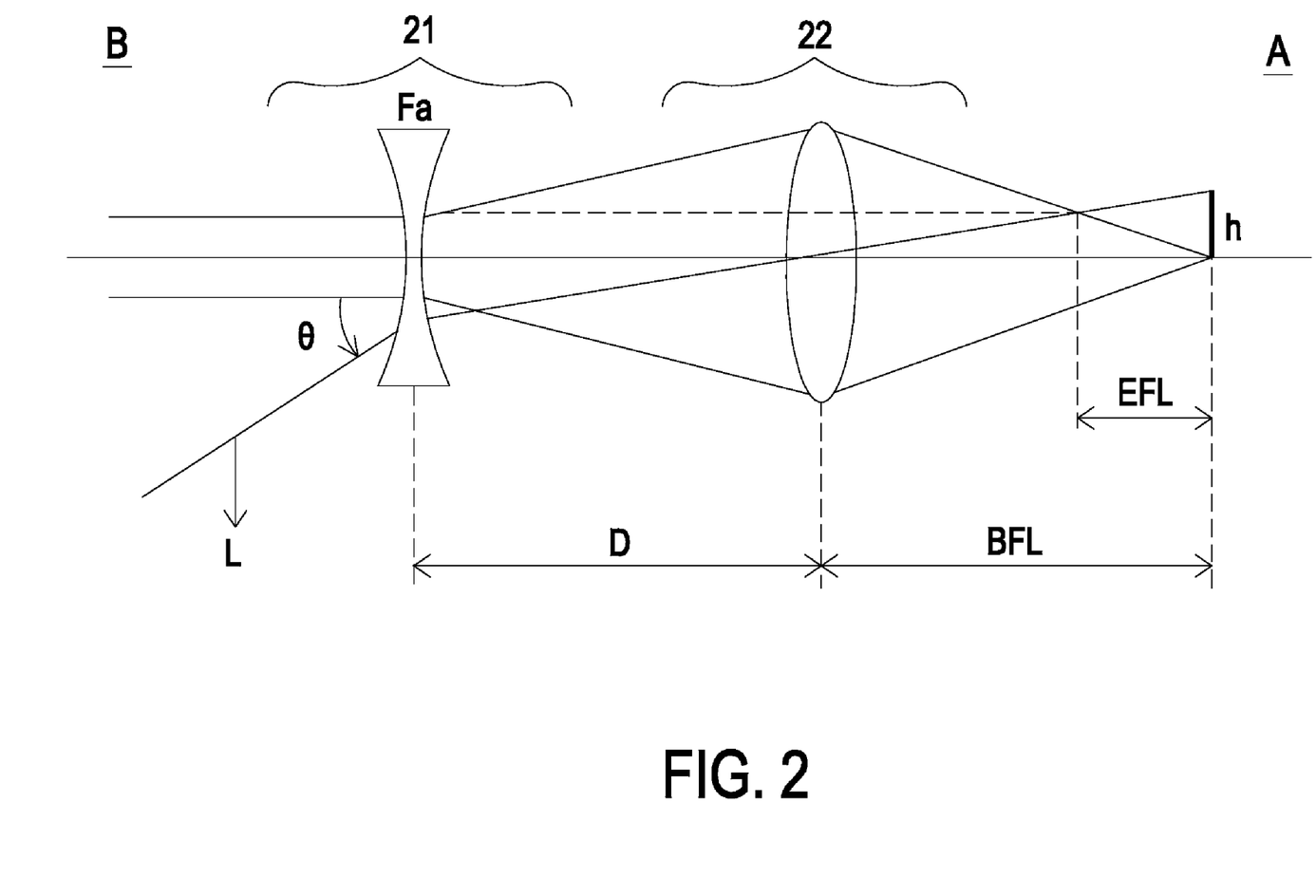
FIG. 2 is a schematic diagram illustrating an exemplary reversed telephoto configuration used in the wide-angle projection optical system of the present invention.

FIG. 2 is a schematic diagram illustrating an exemplary reversed telephoto configuration used in the wide-angle projection optical system of the present invention. From the image side B to the object side A, the reversed telephoto configuration comprises a negative front lens group 21 and a rear positive lens group 22. The rear positive lens group 22 provides a proper working distance or back focal length (BFL). The rear positive lens group 22 also sets up the optical characteristics to match with the illumination optics. The negative front lens group 21 and the rear positive lens group 22 cooperate with each other to correct the aberrations, thereby creating a well-focused and undistorted image on the screen. The negative front lens group 21 is used for bend the chief ray L to provide the required magnification of the image. The effective focal length (EFL) of a reversed telephoto lens is given by the equation (1) below:

$$EFL=(Fa \times BFL)/(Fa-D) \qquad (1)$$

where, Fa is a focal length of the negative front lens group 21, and D is the distance between the negative front lens group 21 and the rear positive lens group 22.

By using a first-order ray trace formula, the full field angle θ of the chief ray L or the full field of view could be deduced from equation (2) below:

$$\text{Full field angle } \theta=(h/BFL) \times (1-D/Fa) \qquad (2)$$

where, h is the height of the micro display.

For a projection display apparatus capable of completely avoiding shining lights on the lecturer who writes on a white board, the full field angle should be larger than ±70 degrees. For a projection display apparatus with a 0.65" 16:10 aspect ratio micro display at 120% offset, the effective focal length (EFL) of the projection lens is in the order of a few millimeters. Obviously, from equations (1) and (2), it is found that to achieve such a large full field angle, Fa needs to be very short, or the front lens group 21 needs to have a very large negative power. Because of the large negative power required in the front lens group 21, the design of the rear positive lens group 22 and the distribution of power among the lenses in the front lens group 21 are very critical in achieving high quality and low distortion images.

Figure 3:
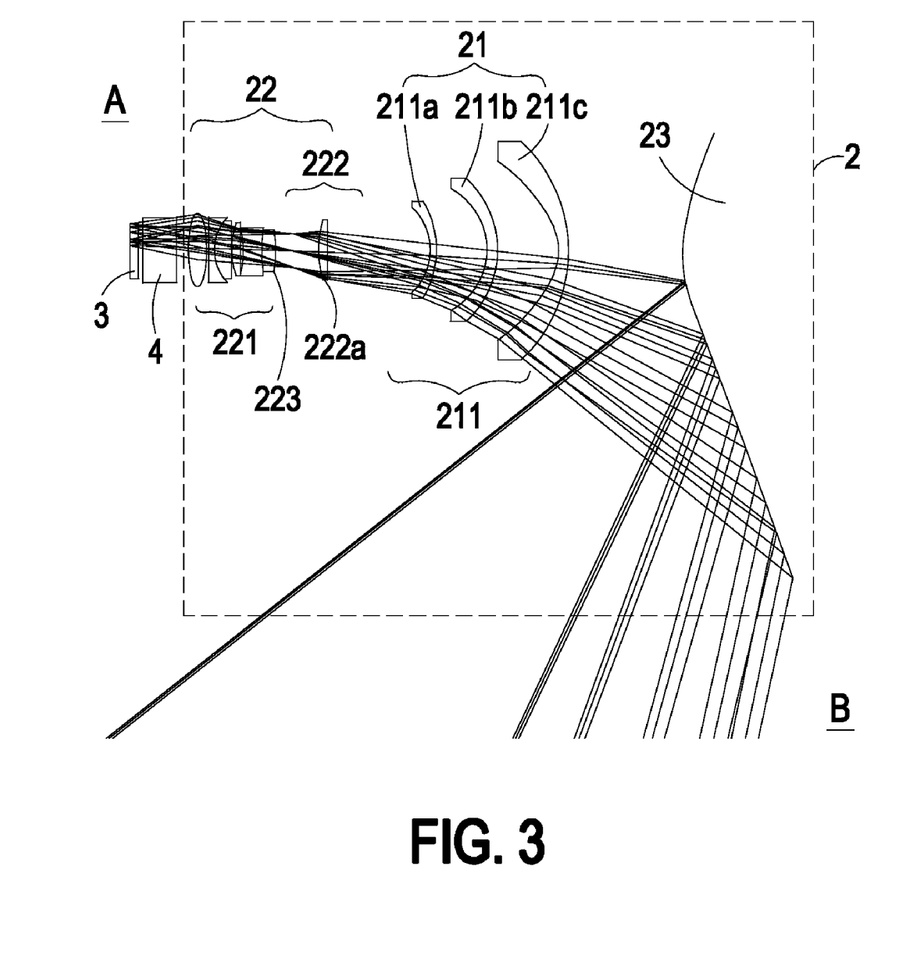
FIG. 3 is a schematic diagram illustrating the architecture of a wide-angle projection optical system according to the present invention.

FIG. 3 is a schematic diagram illustrating the architecture of a wide-angle projection optical system according to the present invention. Please refer to FIGS. 2 and 3. From the object side A to the image side B, the wide-angle projection optical system 2 comprises a rear positive lens group 22, a negative front lens group 21 and a negative power reflecting mirror 23. The rear positive lens group 22 comprises at least two lens sets. The first lens set 221 of the rear positive lens group 22 sets up proper working space and pupil position to match with the illumination optical system. The second lens set 222 of the rear positive lens group 22 is a low power positive lens for helping the correction of spherical and astigmatic aberrations. In some embodiments, the first lens set 221 of the wide-angle projection optical system 2 has an effective focal length (EFL) of 32 mm, which is about 7 to 12 times of that of the system EFL. The second lens set 222 has an effective focal length (EFL) of 65 mm, which is about 15 to 25 times of that of the system EFL.

In this embodiment, the negative front lens group 21 comprises a third lens set 211, which consists of three convex-concave lenses. The effective optical power of the third lens set 211 is properly distributed, so that the bending of chief ray is gradually achieved as it traverses through the second lens set 222 toward the reflecting mirror 23. The three convex-concave lenses of the third lens set 211 closest to the image side B have meniscus-shaped convex surfaces relative to the image side B. In this embodiment, the first convex-concave lens 211a of the third lens set 211 is either a regular spherical lens or a lens with aspheric surfaces. The second convex-concave lens 211b and the convex-concave lens 211c are aspheric lenses, wherein both surfaces of each lens are aspheric.

The negative power reflecting mirror 23 also has an aspheric shape. The negative power reflecting mirror 23 is used for correct the aberration and distortion. The negative power reflecting mirror 23 may also change the optical path, so that the projection lens and hence the main body of the projection display apparatus are located in the space between the reflecting mirror and the screen to achieve a thin and compact projecting system.

In the wide-angle projection optical system 2, the lenses of the lens sets 221, 222 and 211 and the negative power reflecting mirror 23 have a common optical axis. Especially, the lenses of the lens sets 221, 222 and 211 and the negative power reflecting mirror 23 are circularly symmetric with respect to the common optical axis. Moreover, the axis of symmetry (i.e. the optical axis) is shifted with respect to the center of the micro display. As such, when the image is projected on the screen, a proper offset is provided.

Please refer to FIG. 3 again. The wide-angle projection optical system 2 of the present invention is applied to a projection display apparatus including a micro display. The micro display includes plural light valves. Each light valve has an object surface 3. The object surface 3 is an image display surface of the light valve. The object surface 3 is arranged at the object side of the wide-angle projection optical system 2. The projection display apparatus further comprises a polarization beam splitter 4 for guiding a light from a light source to the object side. In addition, the light reflected by the object side is transmitted through the polarization beam splitter 4 and guided to the wide-angle projection optical system 2.

Moreover, the first lens set 221 of the wide-angle projection optical system 2 comprises plural refractive type lenses having positive effective optical power in order to provide the telecentricity to the object space and also converge the light emitted from micro display toward an aperture stop 223. The aperture stop 223 is arranged between the first lens set 221 and the second lens set 222.

The second lens set 222 comprises at least one lens 222a having positive power (e.g. a convex lens). The lens 222a is arranged behind the aperture stop 223. The second lens group can further converge the light beam. The third lens set 221 comprises at least three negative power lenses 211a, 211b and 211c for diverging the light beam to provide enlargement effect. In the third lens set 221, the front and rear surfaces of at least two lenses (e.g. 211b and 211c) are aspheric surfaces in order to correct aberration and distortion. In some embodiments, these two lenses 211b and 211c are manufactured by a plastic molding process. The effective optical power of the lens sets is properly distributed among the lenses in order to lower the sensitivity to mechanical tolerances.

The negative power reflecting mirror 23 further diverges the light beam and reflects the light toward the screen. The reflecting mirror 23 has an aspheric surface to effectively correct the distortion.

Table 1 shows the prescription data of the projection lens. In Table 1, "No." is a surface number from the object side to the image side. For example, "No. 0" indicates the object surface, "No. 1", "No. 2", "No. 3" and "No. 4" indicate all surfaces of the polarization beam splitter 4, "No. 15" indicates the surface of the aperture stop 223, and "No. 24" indicates the mirror surface of the reflecting mirror 23. In addition, "R" indicates radius of curvature, "D" indicates a space between surfaces, "Nd" indicates a refractive index, and "vd" indicates an Abbe number. The front and rear surfaces of the lenses 211a, 211b and 211c of the third lens set 211 (No. 20, No. 21, No. 22, and No. 23) are all aspheric. The mirror surface of the reflecting mirror 23 is also aspheric (No. 24). The aspheric coefficients (C, A2, A4, A6, A8, A10) of these surfaces are listed in Table 2. As a consequence, wide-angle projection optical system 2 of the present invention can achieve a full field angle larger than ±70 degrees.

TABLE 1

| No. | R | D | Nd | vd |
|---|---|---|---|---|
| 0 | Infinity | 0.5 | | |
| 1 | Infinity | 3 | 1.51 | 61.2 |
| 2 | Infinity | 2.5 | | |
| 3 | Infinity | 20 | 1.52 | 64.1 |
| 4 | Infinity | 5 | | |
| 5 | 48.38458 | 8.22 | 1.5 | 81.5 |
| 6 | −46.68644 | 4.73 | | |
| 7 | 44.96219 | 2.43 | 1.79 | 26.3 |
| 8 | 20.03234 | 7.57 | 1.5 | 81.5 |
| 9 | −106.3374 | 0.2 | | |
| 10 | 32.06727 | 4.4 | 1.5 | 81.5 |
| 11 | 276.2004 | 2 | | |
| 12 | 41.61152 | 8.03 | 1.72 | 56.4 |
| 13 | 155.7021 | 7.11 | 1.5 | 81.5 |
| 14 | −96.46147 | 6.4 | | |
| 15 | Infinity | 14.75 | | |
| 16 | 91.89713 | 9 | 1.83 | 42.7 |
| 17 | −120.2314 | 33.77 | | |
| 18 | −24.02027 | 2.24 | 1.5 | 81.5 |
| 19 | −36.99214 | 34.3 | | |
| 20 | −28.54044 | 8 | 1.53 | 56 |
| 21 | −31.05977 | 31.9 | | |
| 22 | −16.82069 | 7.2 | 1.53 | 56 |
| 23 | −53.66645 | 51.3 | | |
| 24 | 67.36121 | −350 | −1 | 0 |

| 24 | −5.095365 | −1.9417E−08 | 3.3877-13 | 3.1988E−18 | −1.4407E−22 |

Figure 4:
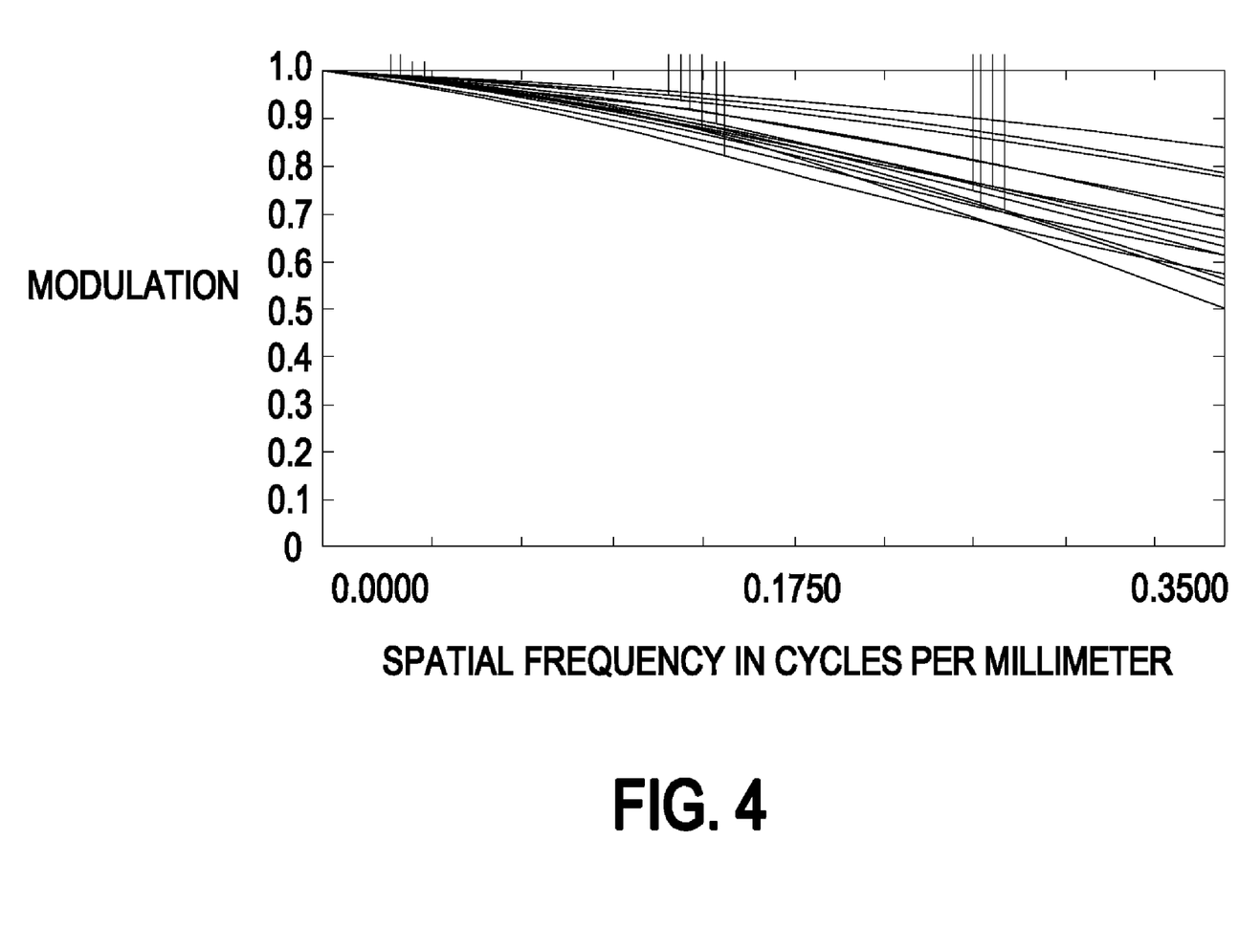
FIG. 4 is a schematic diagram illustrating modulation transfer function (MTF) characteristics in the image side by the wide-angle projection optical system of the present invention.
Figure 5:
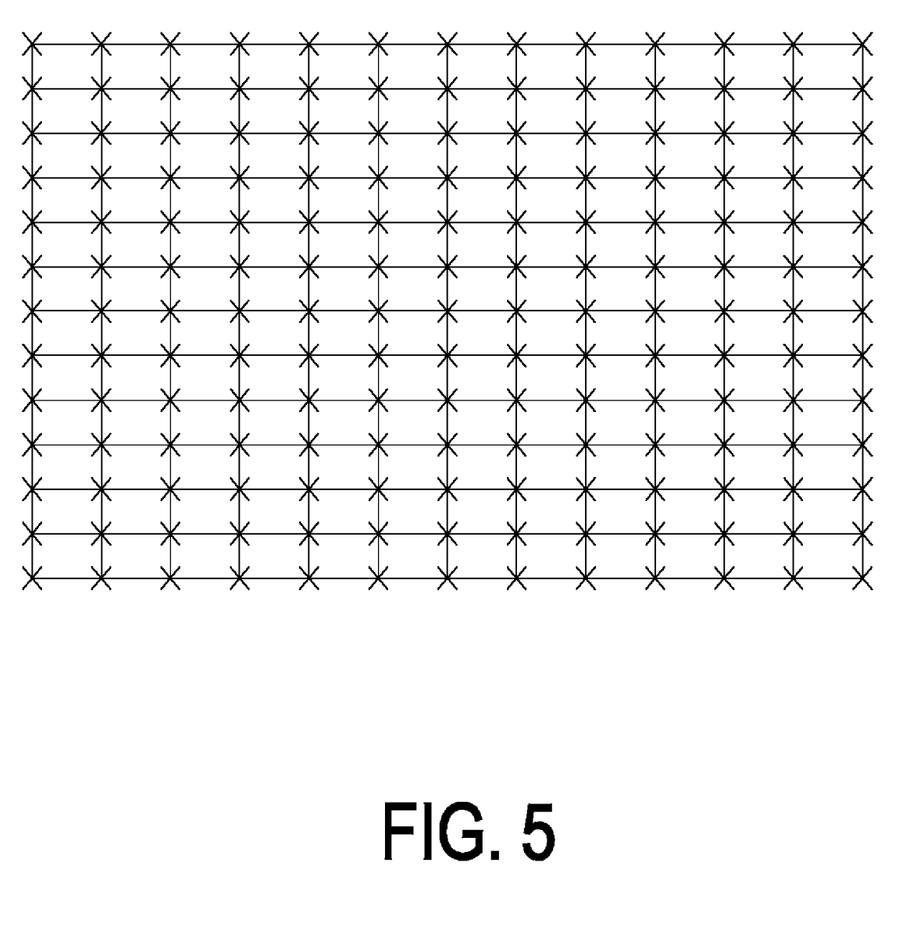
FIG. 5 is a schematic diagram illustrating grid distortion in the image side by the wide-angle projection optical system of the present invention.
Figure 6:
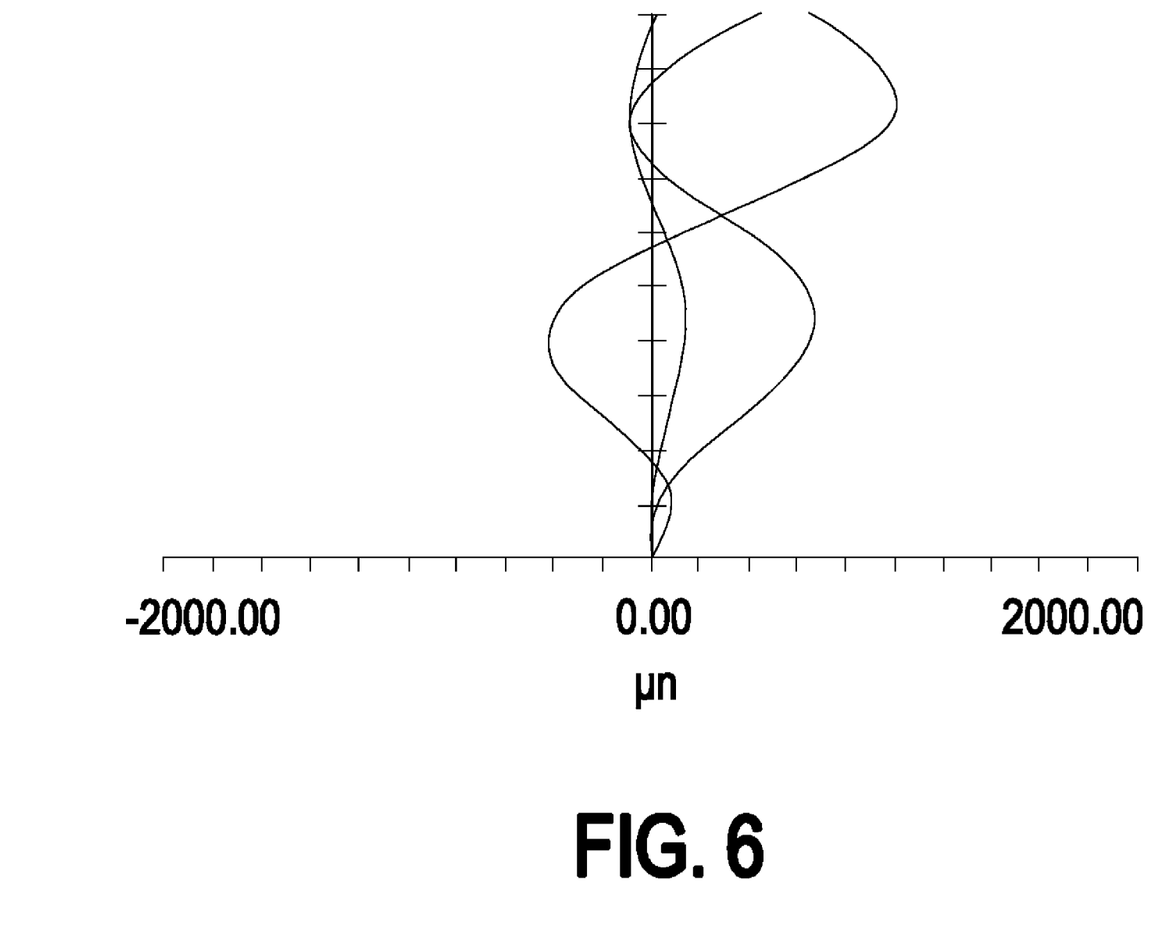
FIG. 6 is a schematic diagram illustrating lateral color in the image side by the wide-angle projection optical system of the present invention.

FIG. 4 is a schematic diagram illustrating modulation transfer function (MTF) characteristics in the image side by the wide-angle projection optical system of the present invention. The horizontal axis indicates spatial frequency (cycles/mm) and the vertical axis of ordinates indicates modulation values. The spatial frequency indicates the number of sine waves per millimeter. The maximum value 1 in the vertical axis indicates that the MTF is 100%. As shown in FIG. 4, the MTF ratio does not obviously decrease, so that sharpness, contrast and recognition of the image are enhanced in achieving high quality. FIG. 5 is a schematic diagram illustrating grid distortion in the image side by the wide-angle projection optical system of the present invention. As shown in FIG. 5, the image distortion or grid distortion can be effectively corrected. FIG. 6 is a schematic diagram illustrating lateral color in the image side by the wide-angle projection optical system of the present invention. As shown in FIG. 6, the chromatic aberration is also effectively corrected. From the above drawings, the wide-angle projection optical system 2 of the present invention has a large full field angle, low image aberration or distortion, good optical characteristics and high image quality.

From the above description, the wide-angle or an ultra-short throw projection optical system of the present invention is capable of providing a large full field angle. The wide-angle projection optical system comprises a first lens set with positive power, a second lens set with positive power, a third lens set with negative power, and a reflecting mirror with negative power. The wide-angle projection optical system may provide a full field angle larger than ±70 degrees, a very short effective focal length, low image distortion and high image quality. The use of the wide-angle projection optical system makes the compact and thin display system possible. Moreover, by means of the wide-angle projection optical system, the projection display apparatus may be installed over the white board or the display screen.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A wide-angle projection optical system, from an object side to an image side, said wide-angle projection optical system comprising:
   a first lens set comprising one or more lenses, having positive power, and converging a light beam coming from said object side;
   an aperture stop;
   a second lens set comprising one or more lenses, having positive power, arranged behind said aperture stop, and configured to converge said light beam;
   a third lens set with negative power, and configured to diverge said light to enlarge a full field angle, wherein said third lens set comprises at least three meniscus lenses, the most image side lens being convex to the image at an optical axis, and both surfaces of each of at least two lenses of said third lens set are aspheric;
   a negative power reflecting minor closer to said image side than said first lens set, said second lens set and said third lens set, and configured to further enlarge said full field angle and correct image distortion; and a micro display, wherein said first lens set, said second lens set, said third lens set and said reflecting minor have a common substantially collinear optical axis, and said optical axis is shifted with respect to a center of said micro display.

2. The wide-angle projection optical system according to claim 1 wherein said three meniscus lenses closest to said image side have meniscus-shaped convex surfaces relative to said image side.

3. The wide-angle projection optical system according to claim 2 wherein both surfaces of each of at least two lenses closest to the image side of said third lens set are aspheric.

4. The wide-angle projection optical system according to claim 2 wherein at least two lenses of said third lens set are manufactured by a plastic molding process.

5. The wide-angle projection optical system according to claim 2 wherein from said object side to said image side, said third lens set comprises a first meniscus lens, a second meniscus lens and a third meniscus lens, wherein said first meniscus lens is either a regular spherical lens or an aspheric lens, both surfaces of said second meniscus lens are aspheric, and both surfaces of said third meniscus lens are aspheric.

6. The wide-angle projection optical system according to claim 1 wherein said reflecting mirror has an aspheric shape.

7. The wide-angle projection optical system according to claim 1 wherein said full field angle is larger than ±70 degrees.

8. A wide-angle projection optical system, from an object side to an image side, said wide-angle projection optical system comprising:
   a first lens set comprising one or more lenses and refracting a light beam coming from said object side;
   an aperture stop;
   a second lens set comprising one or more lenses, arranged behind said aperture stop, and configured to converge said light beam;
   a third lens set having negative power, and configured to diverge said light to enlarge a full field angle, wherein said third lens set comprises at least three meniscus lenses, the most image side lens being convex to the image side at an optical axis, and both surfaces of each of at least two lenses of said third lens set are aspheric; and
   a negative power reflecting minor arranged in the vicinity of said image side, and configured to further enlarge said full field angle and correct image distortion,
   wherein said first lens set, said second lens set, said third lens set and said reflecting mirror have a common substantially collinear optical axis.

9. The wide-angle projection optical system according to claim 8 wherein said first lens set and said second lens set have positive power.

10. The wide-angle projection optical system according to claim 8 wherein said wide-angle projection optical system further comprise a micro display and wherein said optical axis is shifted with respect to a center of said micro display.

* * * * *